No. 805,580. PATENTED NOV. 28, 1905.
J. R. & G. A. PEARSON.
TYPE CASTING AND SETTING MACHINE.
APPLICATION FILED AUG. 29, 1904.
6 SHEETS—SHEET 3.
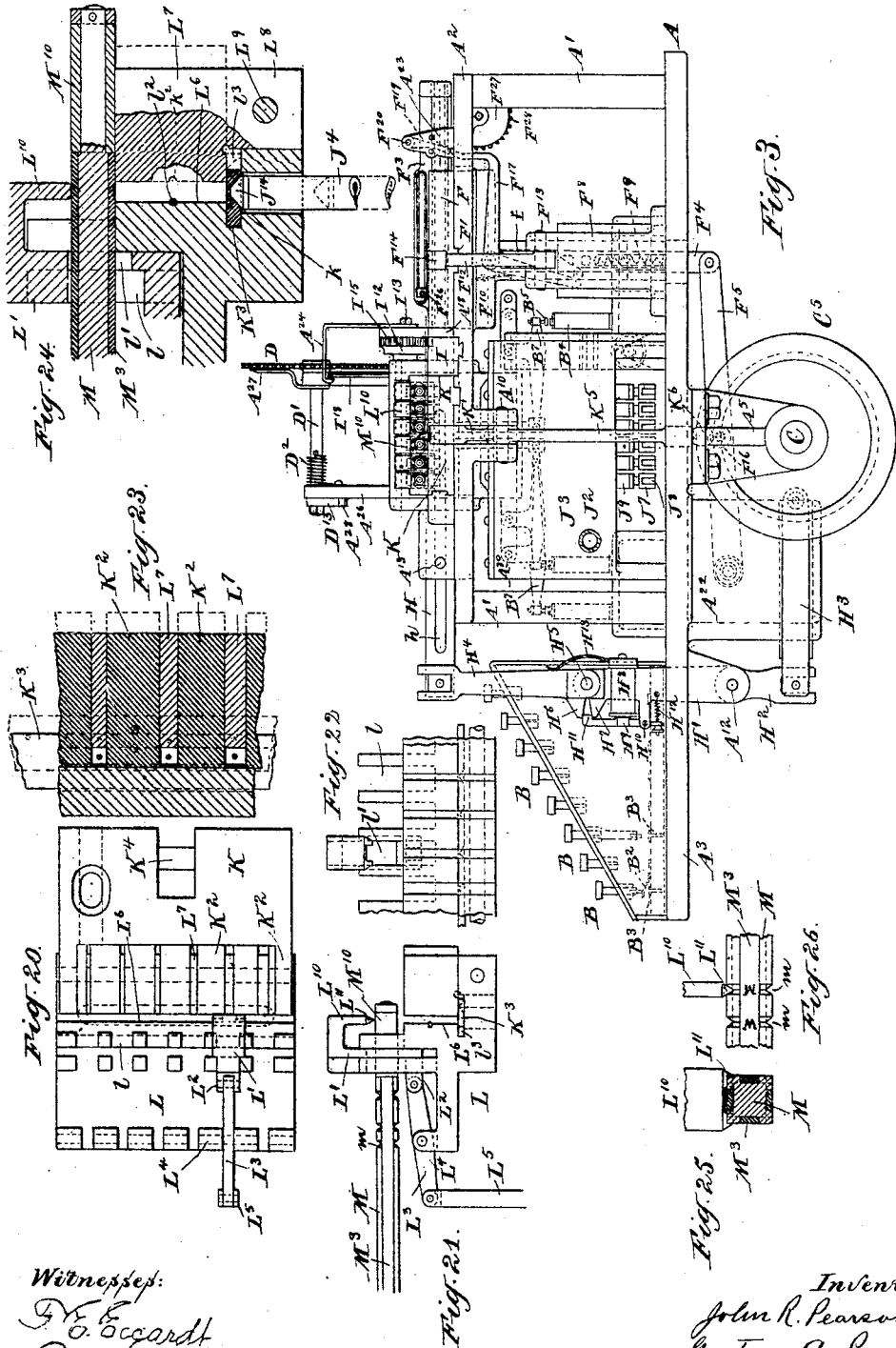
Witnesses:
F. E. Eccardt
B. T. Kapp
Inventors:
John R. Pearson and
Gustave A. Pearson,
by their attorney,
Charles R. Searle.

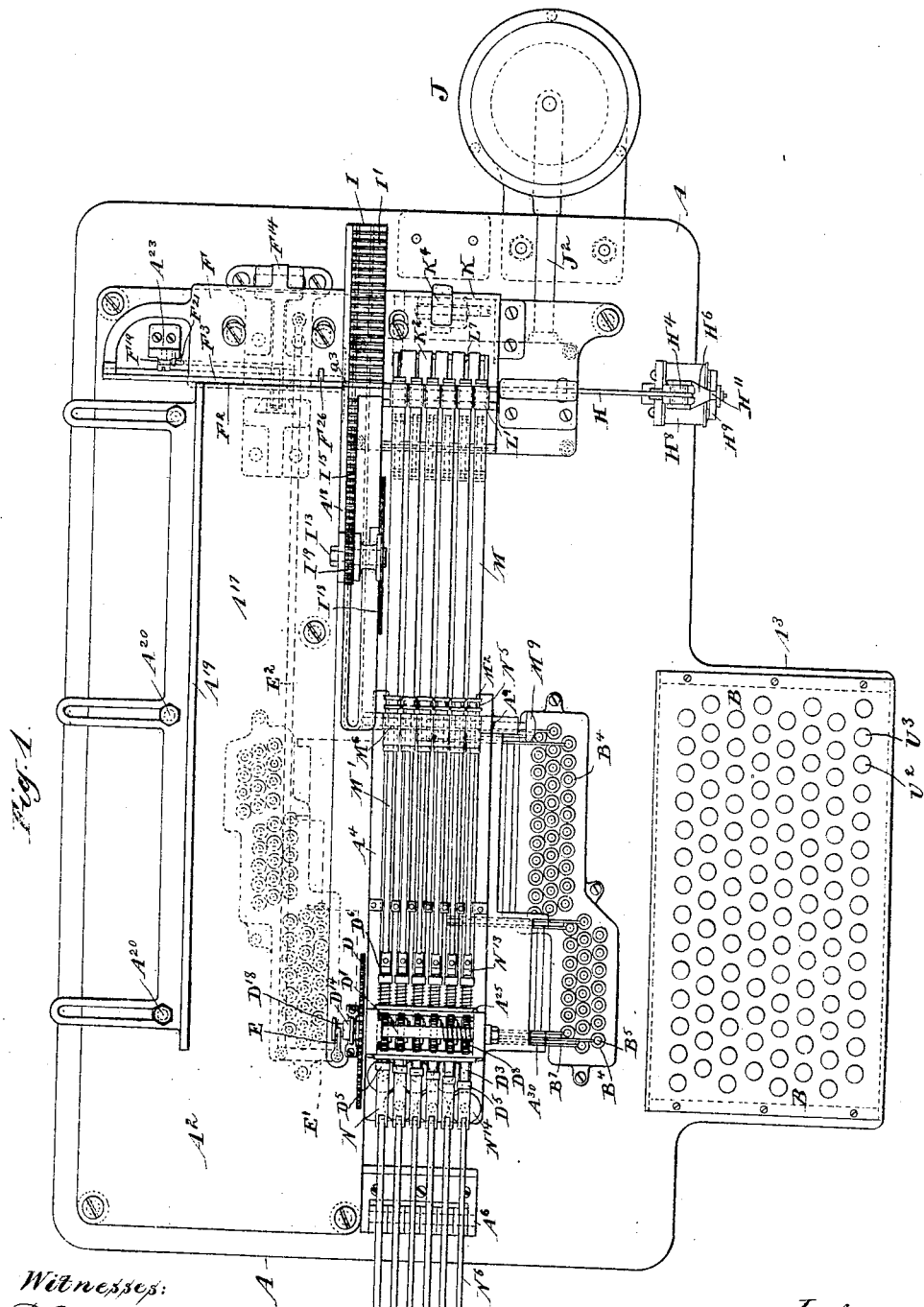

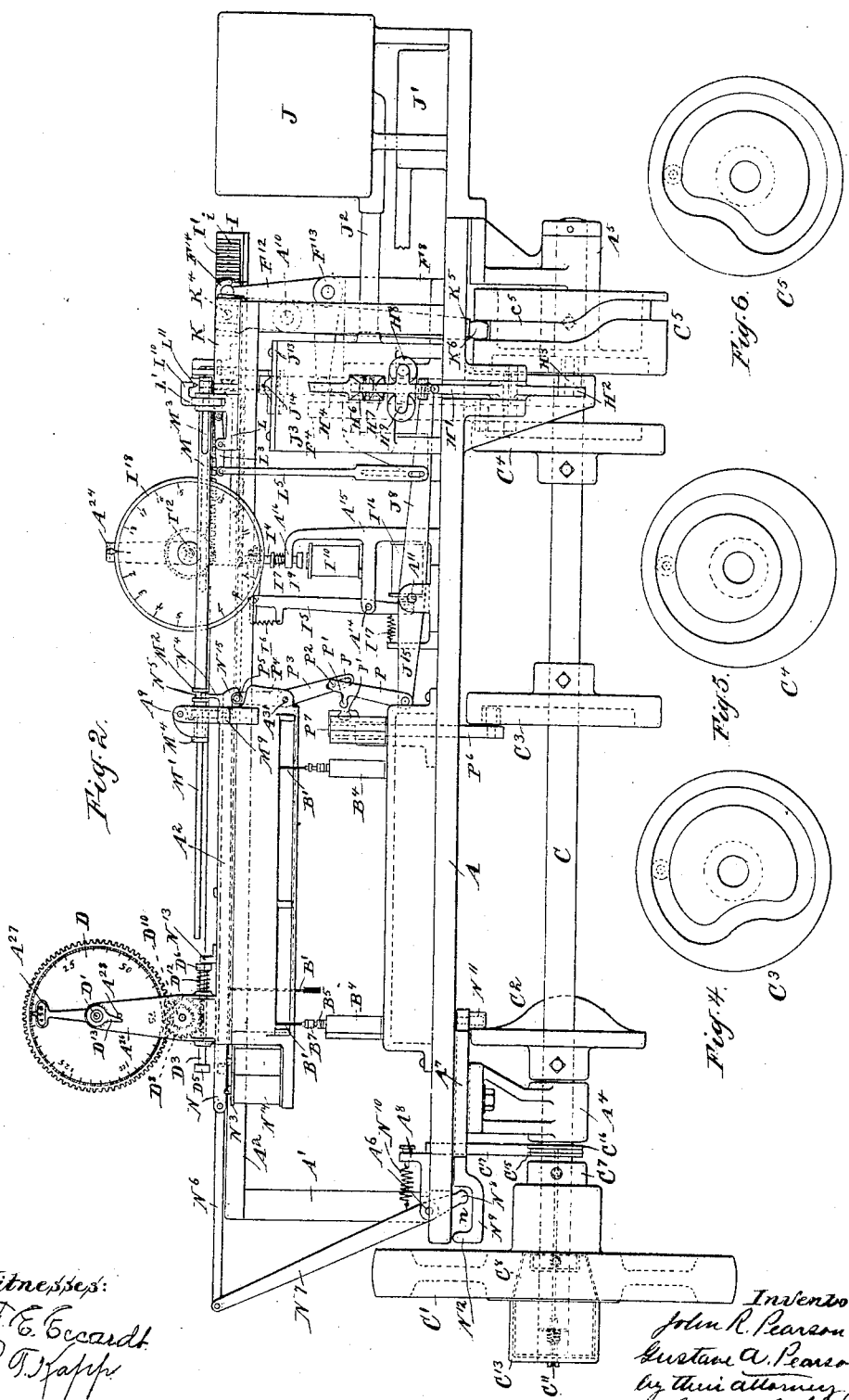

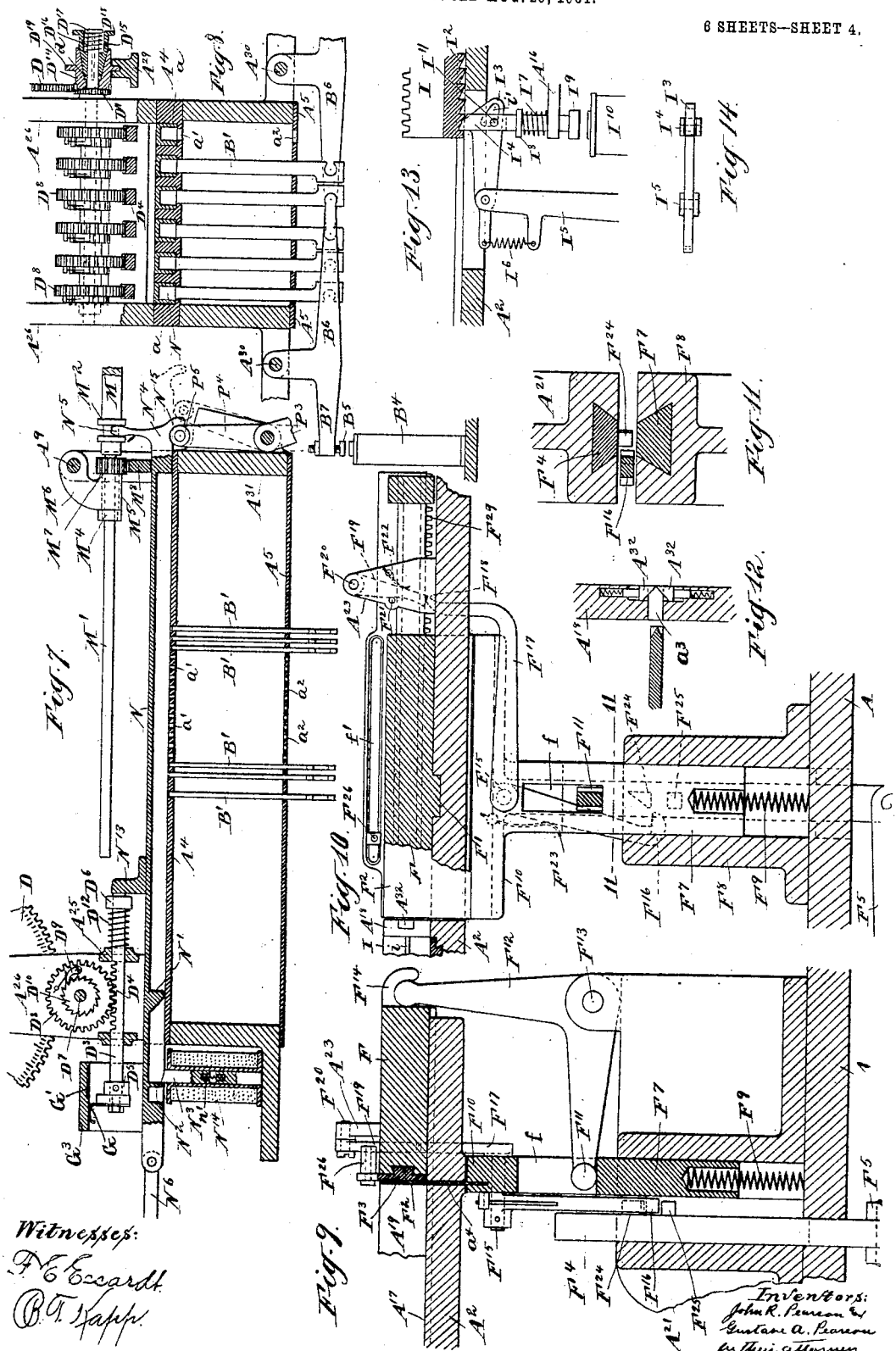

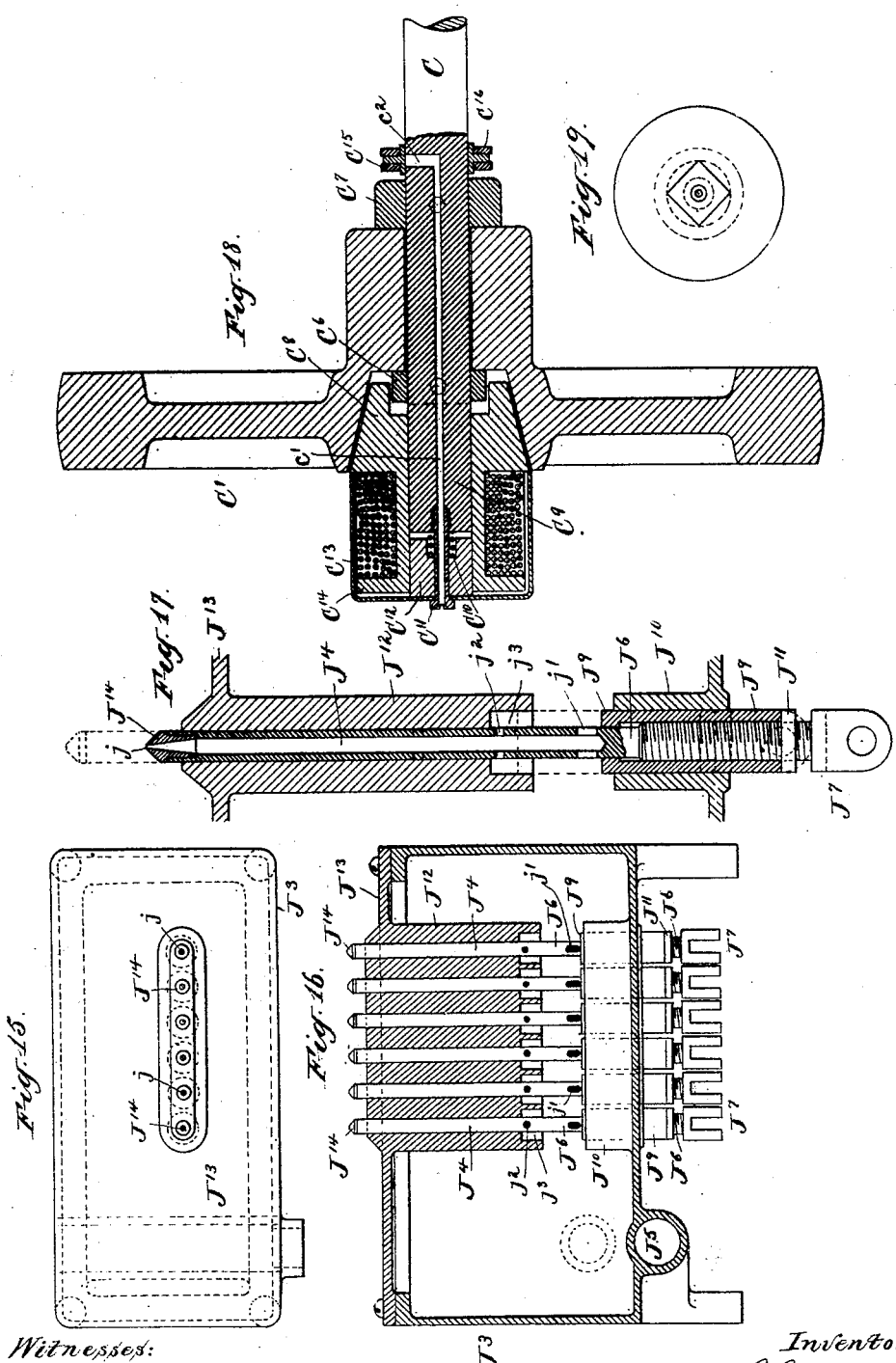

No. 805,580. PATENTED NOV. 28, 1905.
J. R. & G. A. PEARSON.
TYPE CASTING AND SETTING MACHINE.
APPLICATION FILED AUG. 29, 1904.
6 SHEETS—SHEET 6.
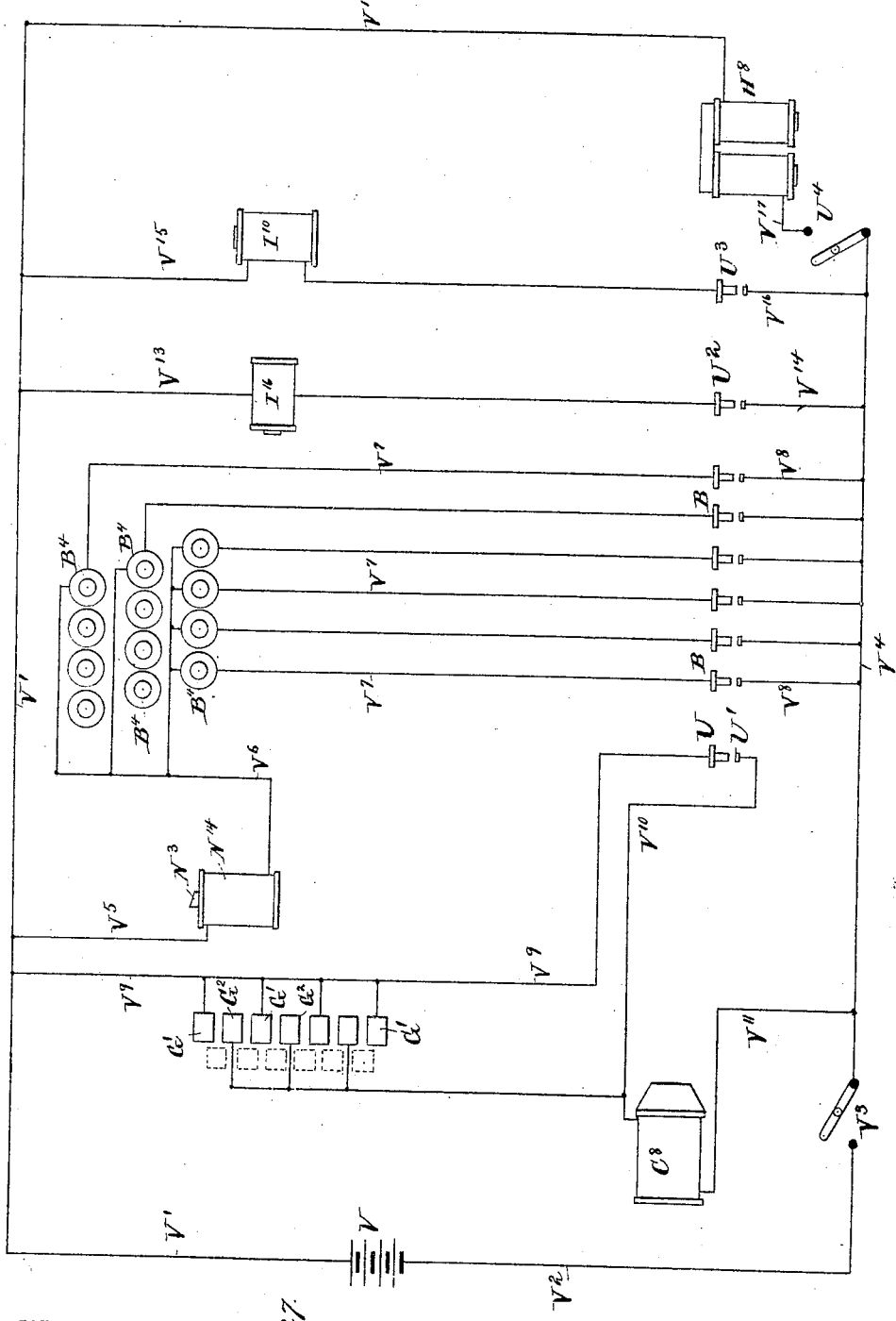

UNITED STATES PATENT OFFICE.

JOHN R. PEARSON AND GUSTAVE A. PEARSON, OF NEW YORK, N. Y., ASSIGNORS, BY MESNE ASSIGNMENTS, TO THE PEARSON TYPO-BAR COMPANY, OF NEW YORK, N. Y., A CORPORATION OF MAINE.

TYPE CASTING AND SETTING MACHINE.

No. 805,580.     Specification of Letters Patent.     Patented Nov. 28, 1905.

Application filed August 29, 1904. Serial No. 222,521.

*To all whom it may concern:*

Be it known that we, JOHN R. PEARSON, a subject of the King of Sweden and Norway, and GUSTAVE A. PEARSON, a citizen of the United States, both residents of the city of New York, borough of Brooklyn, in the county of Kings and State of New York, have invented certain new and useful Improvements in Type Casting and Setting Machines, of which the following is a specification.

The invention relates to that class of typesetting machines in which the types are cast individually and delivered successively to form words or lines.

The object of the invention is to simplify the mechanism and reduce the cost of manufacture and to provide a machine offering an increased range of type characters with greater uniformity and perfection of work and also increased speed in operation.

The invention consists in certain novel features and devices, arrangements of parts, and details of construction by which the above objects are attained, to be hereinafter described.

The accompanying drawings form a part of this specification and show the invention as carried out in practice.

Figure 1 is a general plan view of the machine, certain portions being omitted for clearness. Fig. 2 is a corresponding front elevation without the keyboard and certain other portions. Fig. 3 is an end elevation. Figs. 4, 5, and 6 are face views of certain cams shown in edge view in Fig. 2. The remaining figures are on a larger scale and show details of arrangement and construction. Fig. 7 is a vertical longitudinal section, partly in elevation, showing the mechanism for selecting a desired matrix; and Fig. 8 is a corresponding transverse section partly in elevation. Fig. 9 is a vertical longitudinal section, partly in side view, showing the mechanism for moving forward a completed line; and Fig. 10 is a corresponding end view partly in vertical section. Fig. 11 is a horizontal section on the line 11 11 in Fig. 10. Fig. 12 is a longitudinal section through the wall of the galley and a portion of the ejector-slide. Fig. 13 is an elevation, partly in vertical section, showing the mechanism for controlling the movements of the word-magazine; and Fig. 14 is a corresponding top view of a portion of such mechanism. Fig. 15 is a top or plan view of the type-metal chamber, and Fig. 16 is a corresponding vertical section showing the injectors in elevation. Fig. 17 is a vertical section, partly in elevation, showing one of the injectors and its guides on a still larger scale. Fig. 18 is a vertical section through the pulley and clutch by which the main shaft is rotated, and Fig. 19 is a corresponding end view of a portion. Fig. 20 is a plan view of the body-mold and certain adjacent parts. Fig. 21 is a corresponding side elevation, and Fig. 22 a front view of a portion. Fig. 23 is a horizontal section through the body-mold. Fig. 24 is a vertical section through the same parts. Fig. 25 is a cross-section through one of the matrix-bars, showing a portion of the locking means therefor in elevation; and Fig. 26 is a corresponding side view. Fig. 27 is a diagram showing the arrangement of electric circuits employed in initiating the several movements of the parts.

The machine is direct-acting—that is, the depression of a key causes the corresponding type to be cast without employing a previously-prepared strip or analogous device. The types are produced in accordance with the unit system, self-spacing, and delivered successively in word-chambers in a magazine, from which the words are transferred to a galley, the line being justified during such transference.

The machine is driven by power and the various movements initiated through electromagnets, energized by key-contacts and switches, as permitting more rapid and direct control.

Similar letters of reference indicate the same parts in all the figures.

The bed-plate of the machine is marked A and may be understood to be supported in any suitable manner, and A' A' are standards carrying a plate $A^2$, forming a deck above the bed in a parallel plane therewith. The rectangular bed has a forward extension $A^3$, upon which are the keys B B, arranged in bank in parallel rows, each successive row at a higher level.

Beneath the bed and supported in bearings or hangers $A^4$ $A^5$ thereon is a shaft C, rotated by a pulley C' when the latter is engaged by an electrically-operated clutch. The shaft carries four cams, to be described, by which the mechanisms performing the several operations are actuated.

The matrices for the type-faces are carried on bars M, arranged to slide longitudinally in guides and present their matrices above molds for the type-bodies, the desired matrix being presented by sliding the bar carrying such matrix the proper distance to locate it above the body-mold. Molten type-metal is then injected from below and the desired type cast in an upright position. The type is then pushed sidewise into a word-chamber in a magazine, and the next letter or character on the same or another bar is similarly cast and pushed into the word-chamber until the word is completed. The magazine is then moved to present another word-chamber and the types for the next word similarly introduced. When sufficient words have been formed to produce a line, the words are successively pushed from the magazine to a galley. The line is justified by adding to each word as it is pushed into line except the last a space of proper thickness cast as a type without face, the several words and spaces being just sufficient to fill or justify the line. The latter is then moved forward in the galley and the next line similarly composed, introduced, and justified.

The principal mechanisms producing the required motions may be designated as follows: The matrix-bar reciprocating and stop mechanism, the mold and casting mechanism, the type-ejecting and word-magazine mechanism, the line-formation mechanism, and the indicator mechanism, through which the justification is determined.

The mechanism and operation of the matrix-bars will be first described.

Upon the plate or deck $A^2$ is mounted a guide-plate $A^4$, having a number of grooves $a\ a$ produced in its upper face. Six grooves are shown, each receiving a slide-bar N, matching thereto and adapted to be reciprocated therein. The slide-bars are of rectangular section and are hollowed or U-shaped, with the open side downward. The guide-plate is provided with a series of rectangular openings or narrow slots $a'$ beneath each slide-bar, one for each character and space controlled by such bar. The rearmost slide-bar controls narrow characters of two-units thickness, such as "i," "j," "l," and most of the punctuation-marks and a two-unit space, the next, three-unit characters, such as the letters "r," "a," and a three-unit space, and so on to the sixth and foremost slide controlling "M" and "W" of seven-units thickness and a corresponding space. Thus there are as many slots $a'$ beneath each bar as there are characters of the same units thickness and a similar space. A plate $A^5$, correspondingly perforated, is located a short distance below the guide-plate parallel therewith and having its six series of slots $a^2\ a^2$ in true vertical alinement with those above, and through each vertical pair of slots extends a vertical stop-bar $B'$, standing with its upper end flush with or a little below the bottom of the groove $a$ and adapted to be thrust upward a short distance into the groove by the depression of the corresponding key through connections to be described, and in the hollow under face of each slide-bar is a stop or dog $N'$, adapted to strike either of the stop-bars thus presented and arrest the movement of the slide-bar in one direction. The same or another dog $N^2$ serves by engaging with a detent $N^3$, to be described, to hold its bar in the idle position at the extreme of the return movement.

Each slide-bar carries at its inner end a lug $N^4$, having a forked head $N^5$ engaged between collars $M^2$ on its matrix-bar M, through which the latter is compelled to reciprocate with its slide-bar, and at the other end is pivotally connected a link $N^6$, jointed to the long upper arm of a vertically-mounted lever $N^7$, arranged to swing on a center $A^6$ on the bed-plate, the short arm $N^8$ extending through the bed and lying in a long notch $n$ in the upper face of a slide $N^9$, mounted in ways $A^7$ on the under face of the bed-plate and serving to swing the lever in the direction to return its slide-bar to the normal or idle position, in which it is retained by its detent $N^3$. The swing in the opposite or operative direction is induced by the tensile force of a helical spring $N^{10}$, attached to the long arm of the lever near the center $A^6$ and at the other end to a lug $A^8$, fixed on the upper face of the bed-plate, when the detent $N^3$ releases the slide-bar, the motion being permitted by the notch $n$ in the slide $N^9$. The latter carries a roller $N^{11}$ in the path of a face-cam $C^2$ on the shaft C, which is operated to return to the idle position any of the series of levers by the engagement at the proper time of the lug $N^{12}$, forming one end of the notch. It will be seen that the retraction of either detent releases its slide-bar, which under the influence of its lever $N^7$ and spring $N^{10}$ immediately moves longitudinally in its groove $a$ until arrested by one of its series of stop-bars $B'$, the extent of the movement depending on the particular bar elevated by the depression of the corresponding key.

Each matrix-bar M is shown of square section, and each face carries a matrix-strip $M^3$, on which the matrix characters of corresponding units thickness are produced by electroplating or otherwise, with the faces widthwise of the strip. Each strip is received in a longitudinal groove in the matrix-bar, so that, as shown, each bar carries four strips on which are the same characters, but each strip formed to produce type-faces of a different font. For example, one bar carries on each face the letters "J, K, L, R, S, T" and other letters and characters of the same type thickness, but of a different font. The forked connection above mentioned causes the matrix-bar to move longitudinally with its slide-bar, but permits either strip to be presented to the mold. A squared prolongation M' from the matrix-bar extends parallel with and above the slide-bar N through a short sleeve $M^4$, inclosed in a tubular bearing $M^5$, having an upwardly-curved arm $M^6$, receiving a transverse pin $A^9$, by which all six of the arms and bearings are secured to the framing, with liberty to swing to the slight extent required in raising and lowering the free ends of the matrix-bars without loosening the connection of the forked head.

On each sleeve $M^4$ is a small pinion $M^7$, and all are in mesh with a rack $M^8$, moved by a projecting head or button $M^9$, by which all the matrix-bars may be rotated simultaneously to present strips carrying the same font or type-face to the mold.

The free end of each matrix-bar carries a square sleeve $M^{10}$ on a cylindrical pin set axially of the bar beyond the matrix-strips. The sleeve is of the same sectional dimensions as the bar and forms an extension thereof, serving as a bearing which when the bar is at the extreme of its return movement rests in a rectangular notch $l$ in a guide-block L, secured to the deck $A^2$ and forming part of the type-body mold. In this position the matrix-bars may be partially rotated by the rack $M^8$, one end turning with the sleeve $M^4$ in the tubular bearing $M^5$ and the other end revolving in the square sleeve.

The hinge-joint at $A^9$ permits the free ends of the matrix-bars to be depressed and elevated as required to lower the matrix to the body-mold in forming a type and to raise it to clear the latter after the casting operation. The parts producing this rising and sinking movement form portions of the mold mechanism which will be next described. The raising and lowering of the matrix-bars above the mold is performed by a series of locking-slides L', one for each bar, mounted side by side in vertical ways in the guide-block L and having lugs $L^2$, in which are pivoted the ends of a series of six levers $L^3$, arranged horizontally and centered at $L^4$ in the guide-block L and having each at the other end a link $L^5$, the depression of which through mechanism to be described raises its locking-slide and correspondingly lifts the matrix-bar extending through the rectangular opening $l'$ therein, and the upward movement of the link $L^5$ depresses the locking-slide and carries the matrix-bar down with it into operative relation with the mold.

The vertical face $L^6$ of the guide-block forms one face of all six of the molds and has a transverse rib $l^2$ at about the mid-height, (see Fig. 24,) which produces a nick in the back of the type-body. Below this vertical face the block is recessed, as at $l^3$ to receive a cut-off bar $K^3$, extending transversely of the block, serving as the bottom of all six molds and forming the bases of the bodies.

The cut-off bar $K^3$ has six conical cavities $k\ k$ on its under face, terminating each in a small aperture in vertical alinement with the axis of the matrix-bar above and through which melted type-metal is injected to form the type.

The front face of the mold is formed by six mold-plates $L^7$, each of a thickness to correspond to the units thickness of its matrix-bar above and permanently secured in position in the base of the guide-block by a pin $L^9$ extending through downwardly-projecting portions $L^8$ of each. Between each mold-plate and the next and also on the exterior faces of the two outside plates is a sliding mold-block $K^2$, seven in all, forming the sides of the mold and type and secured to a mold-slide K, moved toward and from the guide-block by a vertical lever swinging on a center $A^{10}$, the upper arm K' pivotally connected to the mold-slide K at $K^4$ and the lower arm $K^5$ carrying a head $K^6$, received in a cam-groove $c^5$ on the periphery of the cam $C^5$ on the shaft C. The mold-slide is guided in ways in the deck $A^2$, and each forward movement of the lever carries the series of mold-blocks $K^2$ into close contact with the face $L^6$ of the guide-block, the series being provided with notches $k^2$, matching to the rib $l^2$, and the mold-slide also carries at the same time the cut-off bar $K^3$ to the position shown in full lines in Fig. 24, and thus completes the four sides and bottoms for the six body-molds. The matrix selected is drawn down by the action of the link $L^5$ of its locking-slide L' to its place above the body-mold, the overhanging arm $L^{10}$, through its wedge-shaped teeth $L^{11}$ engaging in corresponding V-shaped notches $m$ in the matrix-bar, insuring exact presentation and location of the matrix above the mold and its positive retention during the introduction of the molten metal, the mechanism for which will now be described.

J is a reservoir of melted type-metal supported on the bed-plate A and kept at the desired temperature by a burner J'. From the reservoir a pipe $J^2$ leads the molten metal by gravity to a chamber $J^3$, in which are six injectors, one for each mold, and which may also be heated by a jet (not shown) in the passage $J^5$ extending below the chamber from side to side. All the injectors are alike, and a description of one will suffice. Each comprises a vertical stem $J^6$, screw-threaded at the lower portion and hollow or tubular above, as at $J^4$. At the extreme lower end is a head $J^7$, in which is pivoted one end of a horizontal lever, $J^8$ centered at $A^{11}$ on the bed-plate, the other end carrying connections, to be described, by which the lever is tilted at the proper time to raise and lower its stem. The screw-threaded portion receives a screw-threaded sleeve or plunger $J^9$, arranged to rise and sink in a close-fitting cylindrical guide $J^{10}$ in the bottom of the chamber $J^3$, and a cylindrical check-nut $J^{11}$, serving to hold the plunger in the desired position on the stem. Above the plunger the stem is hollow and extends through a long guide $J^{12}$, matching closely thereto and depending from the cover $J^{13}$ of the chamber. At the extreme upper end of the stem is a conical nipple $J^{14}$, shaped to match to the corresponding cavity $k$ in the cut-off bar $K^3$ and having an axial delivery-aperture $j$. Openings $j'$ above the plunger permit the fluid metal to enter the tube, and openings $j^2$ at a higher level permit air to escape therefrom. As the stem rises, the plunger $J^9$ enters the cylinder or enlarged recess $j^3$ at the lower end of the long guide $J^{12}$ and imprisons a quantity of the metal. A further upward movement causes the imprisoned metal to flow through the openings $j'$ and tube $J^4$ and escape in a jet through the nipple $J^{14}$ and cut-off bar $K^3$ into the mold. The stem is then lowered by the movement of the lever $J^8$ ready for another operation.

By raising or lowering the plunger $J^9$ relatively to the stem $J^6$ the amount of metal imprisoned in the cylinder $j^3$ may be regulated, and when the proper position is determined for a given level in the chamber the plunger is maintained in such position by the check-nut $J^{11}$. The amount of metal for each mold will be practically uniform for each type cast therein; but each mold differs in capacity from its neighbor by the difference in units thickness.

The next mechanism to be described is the means for ejecting the type from the mold into the word-magazine.

As soon as the type is cast the locking-slide $L'$ is elevated, carrying the matrix-bar with it, the mold-slide K recedes, carrying with it the series of mold-blocks $K^2$ and the cut-off bar $K^3$, the movement of the latter serving to smoothly finish the bottom of the type. This rearward movement continues until the forward faces of the series of mold-blocks are flush with the front edges of the plates $L^7$, thus forming a straight smooth channel or vertical groove in which the type stands vertically, maintained against falling sidewise by the rib $l^2$, and it is ready to be forced along the channel into one of the word-chambers in the magazine. This movement is effected by the endwise movement of a thin ejector-slide H, traversing the channel and reciprocated therein by a broken lever $H'$, centered at $A^{12}$ below the bed-plate A, the upper arm connected to the ejector-slide and the short lower arm $H^2$ engaged by a slide $H^3$, having an antifriction-roller on its inner end received in a cam-groove in the face of the cam $C^5$ on the shaft C. The long arm $H'$ is broken or carries an extension portion $H^4$ knuckled to the arm at $H^5$ and having a stop-jaw $H^6$ matching to a similar lower jaw $H^7$ on the arm, the extension forming a continuation of the arm and moving therewith.

$H^8$ is an electromagnet mounted on the arm and having an armature $H^9$ pivoted thereon at $H^{10}$ below the magnet. The armature carries a plug $H^{11}$, adapted to be inserted between the jaws by the movement of the armature to the cores of the magnet when the latter is energized and to be swung clear of the jaws by a spring $H^{12}$ when the magnet is inert. A flat spring $H^{13}$ on the back of the arm exerts its force against the extension $H^4$ and tends to throw the latter to the limit determined by the contact of the jaws and normally to hold the arm and its extension in a bent or angular position relatively to each other, the insertion of the plug $H^{11}$ having the effect of straightening those parts and causing them to move stiffly as one. Thus constructed the throw of the short arm $H^2$ is uniform and induces a full swing of the extension when the plug is in the jaws and permits a measure of lost motion when the plug is withdrawn. The ejector-slide has a long slot $h$, in which is received a fixed pin $A^{13}$, so placed as to bring up against the end of the slot at the extreme of the outward movement and cause the jaws to open at each swing of the lever to permit the introduction or withdrawal of the plug and also to limit the outward movement of the ejector-slide. The extent of the inward movement depends on the position of the plug. If the latter is in the withdrawn position, the slide remains idle during the first portion of the inward swing of the arm until the jaws contact and is then driven inward during the remainder of the swing. This last described condition obtains in ejecting the type from the channel to the word-chamber.

I is a sliding magazine guided in ways parallel to the mold-slide K and immediately in rear thereof. It has at the outer end a series of transverse grooves or word-chambers $I'$ on the upper face, each serving when properly presented as a continuation of the type-channel and having a rib $i$, corresponding to the rib $l^2$ on the face of the guide-block L. On the under face is a ratchet $I^2$, by which it is fed forward to present the grooves $I'$ successively to the type-channel. The ratchet is engaged by a pawl $I^3$ and spring-dog $I^4$, one within the other and arranged to engage independently and release together. The pawl $I^3$ is pivotally mounted at the upper end of a vertical lever $I^5$, centered at $A^{14}$ in a frame $A^{15}$ on the bed-plate A, and is held up to the ratchet by a spring $I^6$, and when the lever is swung rides upon the engaged tooth and engages the next, as usual, the ratchet being held against retracting by the vertically-moving forked spring-dog $I^4$, embracing the pawl $I^3$ and having its beveled ends presented to the ratchet by a spring $I^7$, between an arm $A^{16}$ of the frame $A^{15}$ and a collar $I^8$ on the body of the dog. The latter extends through the arm $A^{16}$ and carries at its lower end an armature $I^9$, subject to the attraction of an electromagnet $I^{10}$, through the action of which the ratchet is released. The pawl $I^3$ has a triangular slot $i'$ in its main portion, through which passes a pin $I^{11}$, connecting the two branches of the spring-dog, the slot being so shaped as to allow the pawl to sink, advance, and rise in engaging a succeeding tooth without interference by the pin $I^{11}$; but, when the releasing-magnet $I^{10}$ is energized, to be engaged by the pin and be drawn down with the spring-dog to release the ratchet from both and permit the magazine to run back to its original position with the first word-chamber in line with the type-channel, the return movement being induced by the unwinding of a volute spring, (not shown,) in the hub or barrel $I^{12}$, acting on a short shaft $I^{13}$ and through a pinion $I^{19}$ on the latter, on a rack $I^{15}$, on the inner end of the magazine. The spring is wound during the step-by-step movement of the magazine. The lever $I^5$, carrying the pawl $I^3$, is swung by the action of an electromagnet $I^{16}$ on an armature carried on the short arm of the lever in opposition to the force of a spring $I^{17}$ between the short arm of the lever $I^5$ and a fixed stud on the bed-plate, inducing a return movement when the cores of the trip-magnet $I^{16}$ are demagnetized.

The types are forced successively from the type-channel into the first word-chamber, the movement of the ejector-slide being just sufficient to carry the type beyond the line between the mold and magazine until the word with any character that may follow it is in place. The magazine is then advanced one step and the next word-chamber presented and similarly loaded, the operation of casting the type and characters and the formation of words proceeding until a sufficient number, with the spaces to be subsequently introduced, equals the number of units required to form a line. The magazine is then released by the action of the releasing-magnet $I^{10}$ and is run back to the original position with the first word again in line with the type-channel and the line-formation mechanism, now to be described, performs the operation of forming the words into a line in the galley.

The galley $A^{17}$ is a portion of the plane upper face at the rear of the deck $A^2$. It is separated from the word-magazine by a low wall $A^{18}$, having an opening $a^3$ in line with the first word-chamber and with the type-channel in the mold, the opening being controlled by a pair of bevel-faced sliding gates $A^{32}$, adapted to be forced open to allow the passage of types therethrough and again to close by the action of their springs and present a smooth unbroken face of the wall to the galley. The back wall of the galley is formed by a long gage $A^{19}$, which may be adjusted and set by screws $A^{20}$ to any number of units to produce the required column or page width of matter. The closed end of the galley is a reciprocating follower F, mounted to slide on the deck and guided by a rib $F'$ in a groove therein, and forward of its face is a fence $F^2$, comprising a vertically-reciprocating plate of thin metal projecting upward through a narrow slit $a^4$, extending transversely of the galley, the space between the face of the follower and the adjacent face of the fence being, in effect, a further continuation of the type-channel and occupied by a filling-piece $F^3$, mounted to slide upon the face of the follower and driven back by the advance of the words in the galley against the force of a spring.

The plug $H^{11}$ being inserted between the jaws $H^6$ $H^7$ of the lever $H'$ $H^4$, the throw of the latter is sufficient to drive the ejector-slide through the type-channel in the mold, the word-chamber in line therewith, and through the gates $A^{32}$, so that its inner end or face is flush with the galley-face of the wall $A^{18}$. The first word is thus forced out of the first word-chamber into the galley, driving back the filling-piece $F^3$, the recession of the slightly thinner ejector-slide leaving the last type of the word beyond the gates which close behind it. The magazine is then moved forward by the trip-magnet to present the next word, which, with a space between, as will be described, is similarly introduced, and so on until the line is complete. The fence $F^2$ is then lowered flush with or a little below the floor of the galley, and the follower F moves forward sufficiently to carry the line beyond the line of the fence. The follower then retreats, the fence rises and forms a channel for the next line, and so on, each successive line being pushed forward by the follower and pushing forward the matter previously introduced. The mechanism for producing these motions consists of a vertically-moving bar $F^4$, reciprocating in a guide $A^{21}$ on the bed-plate and protruding below the latter where it is pivoted to the end of a horizontally-disposed lever $F^5$, pivoted at the opposite end to a bracket $A^{22}$ and having at about the mid-length a stud $F^6$, acted upon by a cam-groove on the face of the cam $C^4$ on the shaft C. The effect of a revolution of the shaft is to induce a rising and sinking movement of the bar $F^4$. $F^7$ is a similar slide mounted in a guide $F^8$ with liberty to rise and sink therein, but held normally elevated by the force of a spring $F^9$ beneath it. The upper end of the slide $F^7$ is widened to form a head $F^{10}$, in which is secured the plate or fence $F^2$, protruding into the galley, as above described. At the upper end of the slide below the head $F^{10}$ is a slot $f$, in which is received one end $F^{11}$ of a bell-crank lever centered at $F^{13}$ on the guide $F^8$, the other end $F^{12}$ extending vertically and engaged in a hooked flange $F^{14}$ on the outer face of the follower. The arm $F^{11}$ is normally elevated by the upward tendency of the slide $F^7$ and lies at the bottom of its slot $f$, correspondingly holding the follower in the retracted position. Above the slot $f$ a short shaft $F^{15}$ extends through the slide, and fixed on its inner end is a downwardly-extending hook $F^{16}$, and on the outer end is fixed an arm $F^{17}$, extending nearly horizontally beneath the follower and deck and turned up nearly vertically at the end $F^{18}$, which extends through an opening in the deck and projects slightly above the latter, where it is engaged by a latch $F^{19}$, swung from a pivot $F^{20}$, set in a lug $A^{23}$, secured upon the deck in rear of the filling-piece $F^3$ and in line with an adjustable release-arm $F^{26}$, mounted in a longitudinal slot $f'$, formed in the upper portion of the filling-piece. The latch is held normally against a stop $F^{21}$ by a spring $F^{22}$ in position to engage the protruding end $F^{18}$ of the arm $F^{17}$ and hold the hook $F^{16}$ against the force of a spring $F^{23}$, tending to throw the hook into a more nearly vertical position in which it will be struck by a beveled lug $F^{24}$ on the reciprocating bar $F^4$.

The release-arm $F^{26}$ is so adjusted as to move the latch $F^{19}$ when the line is complete. Such release immediately presents the hook $F^{16}$ in position to be engaged by the lug $F^{24}$, and the downward movement of the bar $F^4$ draws down the fence $F^2$. When the latter has descended sufficiently below the surface of the galley, the metal at the upper end of the slot $f$ strikes the arm $F^{11}$ of the bell-crank lever and the further movement causes the arm $F^{12}$ to drive the follower inward and carry the line forward. On the upstroke of the bar $F^4$ the hook still engaged is carried upward by the square lug $F^{25}$ with the slide $F^7$ and its fence $F^2$, the latter rising through the slit in the galley behind the line of words. The continuation of the upward movement causes the bottom of the slot $f$ again to strike the arm $F^{11}$ of the bell-crank lever and cause the follower F to recede, the filling-piece at the same time traveling forward to the original position between the fence and follower. The spring controlling the filling-piece is a volute contained in a barrel $F^{27}$ and acting upon a pinion $F^{28}$ in mesh with a rack $F^{29}$, formed on the lower edge of the filling-piece.

The lines are justified by introducing spaces of such units thickness between the words as to fill out the line. Thus if the length of the line is one hundred and twenty-eight units and eight words have been set up occupying one hundred units there will be twenty-eight units remaining to be filled by the seven spaces between the words, so that a four-unit space after each word but the last will justify that line. Such spaces are introduced by casting a space of the required units thickness after the word has been placed in position to be driven into the line and forcing it with the word into the galley by the same movement of the ejector-slide, the latter first striking the space and carrying it to the word in the word-chamber and by the continuation of the movement delivering both word and space into the galley.

What has been termed in this description the "justifying mechanism" is, more exactly speaking, means for readily determining the number and thickness of the spaces required for justification.

The elements of the calculation are the number of words in the line and the number of units left in the line after the formation of the words as they are successively formed and delivered to the magazine.

A record of the words is kept on a dial $I^{18}$, fixed on the short shaft $I^{13}$, above described, on which is wound the spring for returning the magazine. On the inner end of the magazine is a rack $I^{15}$ in mesh with a pinion $I^{19}$ on the shaft $I^{13}$. Each advance step of the magazine thus partially rotates the dial, on the margin of which is a series of figures from "1" to "18" and a fixed index or pointer $A^{24}$. Each partial revolution of the dial presents a succeeding figure to the pointer and permits the number of words to be easily read.

The units are registered on a dial D, located on a shaft $D'$ over the sliding bars N. Each sliding bar is equipped with a fixed lug $N^{13}$, adapted to strike the end of a sliding rack-bar $D^3$, located just over each sliding bar and mounted in transverse connecting portions $A^{25}$ between the standards $A^{26}$, in which the dial-shaft $D'$ is mounted. Each rack-bar has a rack $D^4$ on its upper side and a collar $D^5$ on one projecting end, serving as a stop to limit the endwise movement, and an annular abutment $D^6$ on the opposite overhung end, between which and the frame $A^{25}$ is a helical spring urging the rack-bar toward the right, (see Fig. 7,) such movement being resisted by its lug $N^{13}$ on its sliding bar. Each rack $D^4$ is in mesh with one of a series of pinions loosely mounted on the shaft $D^7$, carried in the standards, and each pinion $D^8$ carries a pawl $D^9$, engaging the teeth of a ratchet-wheel $D^{10}$, fixed on the shaft. On the rear end of the shaft is a dial-pinion $D^{11}$, in mesh with the toothed periphery of the dial D.

The stops $D^5$ are set at different distances from the frame $A^{25}$ in conformity with the units thickness of the characters controlled by the sliding bar beneath. When one of the sliding bars is moved to present a matrix on its matrix-bar to the mold, the spring $D^{12}$ on the corresponding rack-bar $D^3$ causes the latter to travel and turns its pinion $D^8$, and through its pawl and ratchet-wheel induces a corresponding partial rotation of the shaft $D^7$, and through the dial-pinion $D^{11}$ correspondingly moves the dial D, the extent of the rotation depending on the sliding bar selected and ranging from two units for the innermost bar to seven units for the outermost.

The return movement of the rack-bar caused by the engagement of its end by the lug $N^{13}$ on the sliding bar is idle, the pinion $D^8$ revolving freely and its pawl riding idly over the teeth of the ratchet-wheel without turning it.

The dial D is divided into any desired number of units. One hundred and fifty are shown, and it is provided with an open index $A^{27}$ and also with a spring $D^2$, coiled upon its shaft and serving to return the dial to any original position in which it may be placed by locating the clamp-finger $D^{13}$ relatively to a fixed stop $A^{28}$ on the standard. The dial is released and permitted to swing back to the original position by the action of a friction-clutch on the inner end of the pinion-shaft $D^7$.

$D^{14}$ is a sleeve carrying the dial-pinion $D^{11}$, loose on the shaft, and having an axial conical cavity $d$, in which is received a cone $D^{15}$, splined and guided on the shaft and held in sufficiently strong frictional engagement with the sleeve by the expansive force of a spring $D^{16}$, encircling the end of the shaft and abutting at one end against the rear face of the cone and at the other against a disk $D^{17}$, fixed upon the end of the shaft. A collar or flange $D^{18}$ on the cone permits it to be drawn backward out of engagement by the action of a finger E on an arm of a horizontally-swinging lever $E'$, the other arm being connected to the follower F by a long link $E^2$ and so arranged that the advance of the follower in the act of pushing a line into the galley will withdraw the cone $D^{15}$ and permit the dial to rotate back to its initial position relatively to its index by the force of the spring $D^2$. The sleeve $D^{14}$ is held against axial movement by an annular flange $D^{19}$, received in a semicircular groove in an open bearing $A^{29}$.

The manner of using the dials is illustrated by the following example: Supposing the line to be one hundred and three units, ten-point type (2.1115 inches) long, the units dial is set with the one hundred and third division showing through the index and the finger $D^{13}$ clamped on the shaft in contact with the stop-pin $A^{28}$. The operation of casting type and characters is then commenced, each letter or character cast inducing a corresponding movement of the units-dial in the direction to reduce the number exhibited, and as each word is completed it is recorded on the words-dial until, let it be assumed, eight words have been stored in the magazine and the number exhibited at the units-dial is "22," indicating that a space of twenty-two units remains in the line in addition to the units of the eight words. The operator sees at a glance at the dials that six three-unit spaces and one four-units space will exactly complete the unfilled units in the line and proceeds to cast such spaces, one after each word excepting the last, and deliver them with the words as the latter are transferred to the galley.

The keys B rest on springs $B^2$, which when depressed make electrical contact with pins $B^3$ and complete circuits through electromagnets $B^4$, acting on armatures $B^5$ on the short arms $B^7$ of the stop-levers $B^6$, centered at $A^{30}$ below the deck $A^2$ and correspondingly elevate the long arms and lift the stop-bars $B'$ and present them in the paths of the dogs $N'$ on the slide-bars N.

The detents $N^3$ for engaging the slide-bars and holding them in the normal or idle positions are shown as solenoids $N^{14}$, which when energized draw down the detents $N^3$ against the force of slight springs $n'$ and release the slide-bars.

On the outer ends of the rack-bars $D^3$ are spring contact-pieces G, arranged to bridge the spaces between fixed contacts $G'$ $G^2$ on the under side of an insulating-support $G^3$ and control the circuit to the magnetic clutch on the shaft C. The pulley $C'$ is loose on the shaft and runs between collars $C^6$ $C^7$, pinned thereon. It has a conical cavity on the outer face of its hub or center in which is received a cone $C^8$, of soft iron, mounted on a squared portion $C^9$ of the shaft and free to slide thereon into and out of frictional engagement with the pulley. It is held out of contact by a spring $C^{10}$, encircling a hollow screw $C^{11}$, set axially of the shaft and extending through a squared block $C^{12}$, similar to the shaft, and also engages a cover $C^{12}$, forming part of the cone. The outer portion of the cone is cylindrical, as $C^{14}$, and has a wide annular groove in which is wound successive layers of insulated wire forming an electromagnet of which the soft iron of the cone is the core. The ends of the wires are brought out and passed through the hollow screw $C^{11}$ and the axial passage $c'$ in the shaft to the radial passage $c^2$, where they join annular contact-pieces $C^{15}$ $C^{16}$, upon which rest springs or brushes $C^{17}$, one of which is connected by a wire to the series of contact-pieces $G'$ above the rack-bars. When the circuit is completed by the movement of one of the rack-bars, the cone is energized and immediately moves upon the shaft into strong frictional contact with the pulley, and the latter causes the shaft and its cams to revolve.

The circuits may be more easily followed by reference to Fig. 27, in which they are shown diagrammatically. V is a battery or other source of electric energy, $V'$ is a line-wire from one pole, and $V^2$ is the terminal of the opposite pole, which when the switch $V^3$ is thrown connects the return-wire $V^4$. From the line $V'$ a wire $V^5$ extends to the solenoid $N^{14}$, the only one represented of the six, and from each solenoid, a wire $V^6$ extends to each of the series of electromagnets $B^4$, controlling the stop-bars for the slide-bar held by that solenoid, and from each electromagnet $B^4$ a terminal wire $V^7$ leads to one contact-point of the corresponding key B, and from the other a wire $V^8$ leads to the return-wire $V^4$. Another wire $V^9$ leads from the line $V'$ to the series of contact-pieces $G'$, and thence is continued to a key U, the contact-point $U'$ of which connects through the wire $V^{10}$ to the cone-magnet $C^8$, and from the latter a wire $V^{11}$ leads to the return-wire. A wire $V^{12}$ connects all the opposite series of contacts $G^2$ to the wire $V^{10}$. A connection $V^{13}$ from the line-wire through the magazine trip-magnet $I^{16}$ and trip-key $U^2$ is completed by a wire $V^{14}$ to the return-wire $V^4$, and a similar connection $V^{15}$ to the magazine release-magnet $I^{10}$ and release-key $U^3$ is completed by a wire $V^{16}$.

The plug-magnet $H^8$ is energized when required by a switch $U^4$, controlling a wire $V^{17}$ from the line-wire through the magnet to the return-wire.

It will be seen that the depression of a character or space key B energizes the stop-magnet for that key and the detent-solenoid $N^{14}$ for the slide-bar carrying the matrix-bar on which that particular character or space is located. As the slide-bar moves forward the corresponding rack-bar $D^3$ also moves forward, and the sliding contact G connects two adjacent contacts $G'$ and $G^2$, energizing the cone-magnet and inducing a revolution of the shaft. The latter, through its cams and connections, induces the required movements of the various mechanisms, all of which excepting that controlling the type-casting and matrix-holding devices have been described. The short vertically-swinging levers $L^3$, centered in the guide-block L, are each connected by a link $L^5$ to the long arm of the corresponding lever $J^8$, to which the injector-stem $J^6$ is attached. The short arm $J^{15}$ of this lever carries at its extremity a swinging link P, having a lug $P'$ near its upper end and a pin $P^2$, engaged in a slot $p$, in the lower end of a bent lever $P^3$, centered at $A^{31}$ below the deck $A^2$. The upper arm $P^4$ of each bent lever carries a roller $P^5$, loosely engaged by a hook $N^{15}$ on the corresponding slide-bar N. $P^6$ is a vertical slide arranged to be depressed by a cam-groove on the face of the cam $C^3$ on the shaft guided in ways in the bed and having a head $P^7$, in which is a transverse groove $p'$ of sufficient length to receive the lug $P'$ on either of the links P when presented thereto. Such lug is presented in the groove by the forward movement of the slide-bar through the bent lever $P^3$, the roller $P^5$ being forced forward until it escapes from the slight depression in the slide-bar, in which it rests while in the idle position. On the return of slide-bar the hook $N^{15}$ draws the roller $P^5$ and its arm into such idle position and withdraws the lug $P'$ from the groove $p'$, which during the engagement has been forced down and produced a corresponding tilting of the lever $J^8$.

The operation of the machine is as follows: The desired character-key B is depressed and through the circuits described the magnet $B^4$ and solenoid $N^{14}$ are energized, resulting in the release of the corresponding slide-bar N and the elevation of a stop-bar $B'$, which presents the corresponding character-matrix above the body-mold. The advance of the slide-bar through the action of the bent lever $P^3$ conditions the matrix-holding mechanism and casting mechanism for action by presenting the lug $P'$ to the groove $p'$. The forward movement of the rack-bar $D^3$ completes the circuit through the cone-magnet $C^8$ and induces a revolution of the shaft, which through the cam $C^5$ and lever $K'$ moves the mold-slide K to close the mold and through the lever $J^8$ and locking-slide $L'$ holds the matrix firmly in position above the mold while the type-metal is injected and the type cast, and the completion of the revolution returns the slide-bar and matrix-bar and through the action of the cam $C^5$ and lever $K'$ retracts the mold-slide and induces a reciprocation of the ejector-slide H, by which the type is delivered into the word-chamber in the magazine. The same movement of the slide-bar moves the rack-bar $D^3$ to move the units-dial D to an extent equal to the units thickness of the type and breaks the circuit, leaving all as before, but with a type in the word-chamber. Another similar cycle casts the next type and deposits it next the first, and so on until the word is complete. The trip-key $U^2$ is then pressed and the magazine moves ahead one step to present the second-word chamber, which is similarly loaded, the movement causing the word-dial to move one division and indicate "2." When enough words for a line are thus deposited, as denoted by the indications of the units-dial, the release-key $U^3$ is pressed and the magazine returned to its original position with the first word opposite the type-channel and in line with the passage between the fence $F^2$ and follower F. The switch $U^4$, controlling the plug-magnet $H^8$, is then thrown to complete its circuit and the plug $H^{11}$ interposed in the jaws $H^6$ $H^7$. The proper space-key is then depressed to cast a space determined by the simple calculation outlined above, the revolution of the shaft thus produced causing a full swing of the lever extension $H^4$, and the ejector-slide strikes the newly-cast space, carries it to the word, and forces both through the opening $a^3$ in the wall of the galley into the latter, correspondingly forcing back the filling-piece $F^3$. This continues until the line is complete, at which time the release-pin $F^{26}$ strikes the latch $F^{19}$ and engages the hook $F^{16}$ between the lugs $F^{24}$ and $F^{25}$ on the slide $F^7$, which has been rising and sinking idly, and withdraws the fence, causes the follower to force the line ahead in the galley and to retreat again, and with the elevation of the fence again condition all as before. This movement of the follower is performed automatically by the act of casting the first type for the first word of the succeeding line by the usual revolution of the shaft. When the line to be moved is the last line to be set up, the movement of the follower is induced by depressing the key U and causing a revolution of the shaft and movement of the follower, the other functions of the revolution being idle or ineffective, the mold-slide moving idly to and from the mold-block and the slide P⁶ moving up and down in obedience to its cam, but without performing any operation.

By arranging the matrices for the series of types of the same units thickness in a single line the presentation of either above the corresponding body-mold is easily accomplished and the selection of the desired character facilitated.

By revolving the matrix-bars a different font of the same thickness may be readily substituted.

The automatic forward movement of the completed line in the galley is also an important feature.

Justification by the inspection of the dials enables the operator to arrange the matter to produce the best typographical effect and the casting of individual types of the self-spacing system allows transposition, rearrangement, and additions to the matter and also offers the additional advantage of type which may be distributed and sold instead of being returned to the melting-pot.

Although the matrix-bars are shown and described as being six in number, each having four matrix-faces, it will be understood that the number of bars may be greater or less, and that one, two, or three of such faces may be equipped with matrices, or bars of hexagonal or other section may be employed having six or other number of matrix-faces.

Instead of the magnets and electric connections described for inducing the initial movements mechanical means may be substituted. The electric arrangement is preferred as requiring less effort on the part of the operator and as being exceedingly rapid and positive in action.

Other modifications may be made as found necessary or desirable in adapting the machine to the conditions under which it may be called upon to serve.

We claim—

1. In a type-casting machine, a type-body mold, a matrix-bar having a series of matrices arranged in a row on the face thereof, a vertically-movable centering device, and means for moving said bar longitudinally to present either matrix to said body-mold and means for moving said matrix-bar and centering device vertically to release the type.

2. In a type-casting machine, a type-body mold, a matrix-bar having a plurality of faces, a series of matrices on each face, means for moving said bar longitudinally to present either matrix of a series to said body-mold, and means for revolving said bar to present either series in operative relation to said mold.

3. In a type-casting machine, a plurality of type-body molds adapted to produce bodies of different thickness, and a plurality of matrix-bars each carrying a series of type-face matrices arranged in a single row and adapted to serve with one of said molds, a vertically-movable centering device, means for moving said bars longitudinally to present said matrices to said molds and means for moving said matrix-bar and centering device vertically to release the type.

4. In a type-casting machine, a plurality of type-body molds adapted to produce bodies of different thickness, a plurality of matrix-bars each having a plurality of faces, a series of type-face matrices arranged in a row on each of said faces, means for revolving said bars to present either series in operative relation to said molds, and means for moving said bars longitudinally to present either matrix of such series to its body-mold.

5. In a type-casting machine, a plurality of type-body molds adapted to produce bodies of different thickness, a plurality of matrix-bars each adapted to serve with one of said molds, a plurality of faces on each bar, each face containing a series of matrices for different fonts of type, means for revolving said bars simultaneously to present the same font series on all the bars in operative relation to said molds, and means for moving said bars to present either matrix of such series to its mold.

6. In a type-casting machine, a type-body mold a vertically-movable centering device, a matrix-bar having a series of matrices arranged in a row on its face, means for moving said matrix-bar longitudinally to present either matrix in operative relation to said mold means for moving said matrix-bar and the centering device vertically to release the type, and means for arresting said bar when the desired matrix is thus presented.

7. In a type-casting machine, a type-body mold, a matrix-bar having a series of matrices arranged in a row on its face, a sliding bar connected to said matrix-bar, and means for moving said sliding bar longitudinally, a series of stop-bars located along the path of said sliding bar, and means for moving said stop-bars into said path and into engagement with said sliding bar and arresting the movement of said sliding bar and matrix-bar.

8. In a type-casting machine, a type-body mold, a matrix-bar having a series of matrices arranged in a row on its face, a sliding bar connected to said matrix-bar and means for moving said sliding bar longitudinally, a series of stop-bars located along the path of said sliding bar, a series of magnets for moving said stop-bars into said path and into engagement with said sliding bar and arresting said sliding bar and matrix-bar, and keys for completing electric circuits and energizing such magnets.

9. In a type-casting machine, a plurality of type-body molds of differing thickness, a matrix-bar above each of said molds, carrying matrices for types of corresponding thickness arranged in a row on its face, means for moving said matrix-bars longitudinally, a vertically-movable centering device, means for moving the matrix-bar and the centering device vertically to release the type, and a series of stop-bars for each matrix-bar arranged to arrest such longitudinal movement and present a desired matrix in operative relation to its mold.

10. In a type-casting machine, a plurality of type-body molds, a series of matrix-bars located one above each of said molds, and means for moving said matrix-bars longitudinally a vertically-movable centering device, means for moving the matrix-bar and the centering device vertically to release the type, a series of stop-bars for each matrix-bar, arranged to arrest such longitudinal movement and present the desired matrix in operative relation to its mold.

11. In a type-casting machine, a plurality of type-body molds, a guide above each of said molds, a matrix-bar in each of said guides, a sliding bar connected to each matrix-bar the connection constructed to permit the matrix-bar to revolve, means for moving said sliding bars longitudinally and means for lowering and raising said matrix-bars into and out of operative relation with said molds.

12. In a type-casting machine, a plurality of type-body molds, a plurality of matrix-bars, each received in a sleeve and free to slide therein and revolve therewith, a pivotal bearing for said sleeve, a pinion on each of said sleeves, a rack engaging said pinions, whereby said matrix-bars are revolved simultaneously, and means for moving said matrix-bars longitudinally in said sleeves.

13. In a type-casting machine, a plurality of body-molds a guide-block common to all of said molds and forming one face thereof, a plurality of matrix-bars, arranged one above each of said molds and guided in said guide-blocks, a plurality of mold-plates forming the opposite faces of said molds, and mold-blocks arranged to slide between said plates and form the sides of said molds.

14. In a type-casting machine, a plurality of body-molds a guide-block common to all of said molds and forming one face thereof, a plurality of matrix-bars arranged one above each of said molds and guided in said guide-block, a plurality of mold-plates forming the opposite faces of said molds, mold-blocks arranged to slide between said plates and form the sides of said molds, and a cut-off bar arranged to slide beneath said molds and form the bottoms thereof.

15. In a type-casting machine, a plurality of body-molds a cut-off bar common to all of said molds and forming the bottoms thereof, and having an aperture for each of said molds, and a plurality of injectors, one for each mold, arranged to match to said apertures and supply melted metal therethrough to said molds.

16. In a type-casting machine, a plurality of body-molds a plurality of matrix-bars arranged one above each of said molds, means for lowering said bars into operative relation with said molds and holding them in such relation, a plurality of injectors arranged to supply melted metal to the bottoms of said molds, and connections between said injectors and holding means for inducing simultaneous action.

17. In a type-casting machine, a plurality of body-molds a guide-block common to all of said molds and forming one face thereof, a plurality of matrix-bars arranged one above each of said molds and guided in said guide-block, a plurality of mold-plates forming the opposite faces of said molds, mold-blocks arranged to slide between said plates and form the sides of said molds, a mold-slide to which said mold-blocks are attached, and means for moving said mold-slide, whereby said mold-blocks are retracted to lie flush with the edges of said plates and form an unobstructed channel for the delivery of a type therein.

18. In a type-casting machine, a plurality of body-molds, arranged side by side and adapted when open to present a straight unobstructed channel through all of the molds, means for maintaining the type vertically in said channel and preventing its falling sidewise, and an ejector-slide arranged to serve with all of said molds and to traverse said channel and eject a type cast therein.

19. In a type casting and setting machine, a plurality of body-molds arranged side by side and adapted when open to present a straight unobstructed channel therethrough, a magazine having a word-chamber adapted to form a continuation of said channel when presented thereto, and an ejector-slide arranged to traverse said channel and transfer a type therein to said chamber.

20. In a type casting and setting machine, a plurality of body-molds arranged side by side and adapted when open to present a straight unobstructed channel therethrough, a magazine having a plurality of word-chambers each adapted to form a continuation of said channel when presented thereto, means for moving said magazine to present successive word-chambers, and means for transferring a type in said channel to one of said chambers.

21. In a type casting and setting machine, a plurality of body-molds arranged side by side and adapted when open to present a straight unobstructed channel therethrough, a galley having a passage adapted to receive a line of type, a magazine between said molds and galley and having a plurality of word-chambers each adapted to form an open connection between said channel and passage, and means for transferring types from said channel and word-chamber to said passage.

22. In a type casting and setting machine, a plurality of molds, and means for casting types therein, a galley a magazine between said molds and galley and having a plurality of word-chambers, a follower and fence on said galley forming between them a passage for receiving a line of type, and means for transferring types from said molds to said passage.

23. In a type casting and setting machine, a plurality of molds and means for casting types therein, a galley, a follower and fence thereon forming between them a passage for receiving a line of type, means for transferring types from said molds to said passage, means for depressing said fence, moving said follower and line forward, and again elevating said fence and retracting said follower to condition said passage to receive a succeeding line.

24. In a type casting and setting machine, a plurality of molds and means for casting type therein, a galley, a follower and fence thereon forming between them a passage for receiving types from said molds, means for transferring types from said molds to said passage to form a line, and means actuated by the completion of said line for automatically depressing said fence and moving forward said follower and line, and again conditioning said passage for the reception of a succeeding line.

25. In a type casting and setting machine, a plurality of molds and means for casting types therein, a galley, a follower and fence thereon forming between them a passage for receiving types from said molds, a spring-actuated filling-piece adapted to slide in said passage, means for transferring types from said molds to said passage to form a line in opposition to said filling-piece, and means actuated by the movement of said filling-piece for automatically depressing said fence and moving said follower and line forward, and again conditioning said passage for the reception of a succeeding line.

26. In a type casting and setting machine, a plurality of molds, a magazine having a series of word-chambers each adapted to receive types from said molds, means for moving said magazine to present successive chambers to receive successive words, and means operated by said magazine for registering the number of words received.

27. In a type casting and setting machine, a plurality of molds, a magazine having a series of word-chambers each adapted to receive types from said molds, means for moving said magazine to present successive chambers to receive successive words, a rack on said magazine, a pinion meshing with said rack, a dial operated by said pinion, and an index for said dial, whereby the number of words received in said chambers is indicated by said dial and index.

28. In a type casting and setting machine, a plurality of molds each adapted to produce a body of different thickness, a plurality of matrix-bars for such molds, each adapted to produce type-faces of corresponding thickness, means actuated by the movements of said matrix-bars for cumulatively registering the thickness of the types cast, whereby the space occupied in a line of successive words cast in said molds is shown and the space required to justify such line is indicated.

29. In a type casting and setting machine, a plurality of molds each adapted to produce a body of different thickness, a plurality of matrix-bars for such molds each adapted to produce type-faces of corresponding thickness, a magazine having a series of word-chambers each adapted to receive types from said molds forming a word, means for moving said magazine to present successive chambers to receive successive words, means actuated by said magazine for registering the number of words thus received, and means actuated by the movements of said matrix-bars for cumulatively registering the thickness of the type cast, whereby the number of words and the space occupied thereby in a line is shown, and the number and thickness of the spaces required to justify such line are indicated.

30. In a type casting and setting machine, a plurality of molds each adapted to produce a body of different thickness, a plurality of matrix-bars for such molds each adapted to produce type-faces of corresponding thickness, a magazine having a series of word-chambers each adapted to receive types from said molds forming a word, means for moving said magazine to present successive chambers to receive successive words, means actuated by said magazine for registering the number of words thus received, a galley, means for transferring words from said magazine to form a line in said galley, a follower adapted to move said line forward, and means for operating said follower, means actuated by the movements of said matrix-bars for cumulatively registering the thickness of the types cast, whereby the number of words and the space occupied thereby in the line is shown, and the number and thickness of the spaces required to justify such line are indicated, and means actuated by said follower for automatically conditioning said type-thickness register for similarly indicating the succeeding line.

31. In a type-casting machine, a matrix-bar having a plurality of faces formed to produce type-faces of a different font, said bar being rotatably mounted to bring different faces into operative position and means for reciprocating said matrix-bar.

32. In a type-casting machine, a rotatably-mounted matrix-bar having a plurality of faces formed to produce type-faces of a different font, and means for oscillating said rotatably-mounted matrix-bar.

33. In a type-casting machine, a rotatably-mounted matrix-bar having a plurality of faces formed to produce type-faces of a different font, and means for moving said matrix-bar longitudinally irrespective of its rotation.

34. In a type-casting machine, a rotatably-mounted matrix-bar having a plurality of faces formed to produce type-faces of a different font, means for rotating said bar and means for moving said bar longitudinally irrespective of its other movements.

35. In a type-casting machine, a plurality of rotatably-mounted matrix-bars each having a plurality of faces formed to produce type-faces of a different font, and means for rotating all of said matrix-bars simultaneously.

36. In a type-casting machine, a plurality of rotatably-mounted matrix-bars each having a plurality of faces formed to produce type-faces of a different font, and means for rotating all of said matrix-bars simultaneously, and means for reciprocating each bar independently of its other movement.

In testimony that we claim the invention above set forth we affix our signatures in presence of two witnesses.

JOHN R. PEARSON.
GUSTAVE A. PEARSON.

Witnesses:
MICHAEL N. DELAGI,
CHARLES R. SEARLE.